United States Patent

[11] 3,624,276

| [72] | Inventors | Charles B. Rawlins;<br>Fred R. Collins, both of Massena, N.Y. |
|---|---|---|
| [21] | Appl. No. | 78,469 |
| [22] | Filed | Oct. 6, 1970 |
| [45] | Patented | Nov. 30, 1971 |
| [73] | Assignee | Aluminum Company of America<br>Pittsburgh, Pa. |

[54] CONDUCTOR BUNDLE ARRANGEMENT
10 Claims, 9 Drawing Figs.

[52] U.S. Cl. .................................................. 174/129 R,
57/145, 174/42, 174/127
[51] Int. Cl. ...................................................... H01b 5/08,
H02g 7/14
[50] Field of Search .......................................... 174/40 R,
42, 43, 127, 128, 129 R, 130, 131 R, 131 A, 131 B;
57/139, 144, 145, 146

[56] References Cited
UNITED STATES PATENTS
| 1,999,273 | 4/1935 | Austin ........................... | 174/128 |
| 1,999,502 | 4/1935 | Hall .............................. | 174/129 R |

*Primary Examiner*—Laramie E. Askin
*Attorneys*—Robert E. Isner and Peter J. Franco ABSTRACT: Conductor bundle arrangement comprising adjacently disposed conducting cable assemblies operatively interconnected to form a conductor bundle, each conducting cable assembly including an electrically conductive core, e.g. a helically laid multistranded core, having a composite substantially circular cross-sectional shape and a surrounding sheathing layer having a composite substantially annular cross-sectional shape with an exposed peripheral surface portion in the form of a multiplicity of helically oriented and adjacently disposed convex longitudinally extending arcuate ridges of progressively varying size, e.g. by providing said sheathing layer of varying diameter wires helically laid about the core in covering relation therewith, the sheathing layer including at each transverse section thereof at least one predetermined large size first ridge, e.g. wire, disposed at a first circumferential point and at least one predetermined small size last ridge; e.g. wire, disposed at a second circumferential point in diametric relation therewith, and a plurality of intermediately disposed ridges, e.g. wires, of progressively smaller sizes than that of the first ridge but larger than that of the last ridge adjacently disposed in the sheathing layer on each side of the at least one first ridge and occupying the remainder of the circumference thereof between said first and second points in corresponding substantially uniformly decreasing order of sizes in accord with the progressive peripheral remoteness thereof from the at least one first ridge, the exposed surface of the sheathing layer peripherally providing a composite silhouette characterized by a longitudinally repetitive variation in surface roughness around the circumference of the sheathing layer in accord with the helical disposition of the differing size ridges, e.g. wires, therein, the sheathing layer preferably being formed of round wires of size and disposition corresponding to said ridges and having a composite cross-sectional shape corresponding substantially to that of an eccentric annulus.

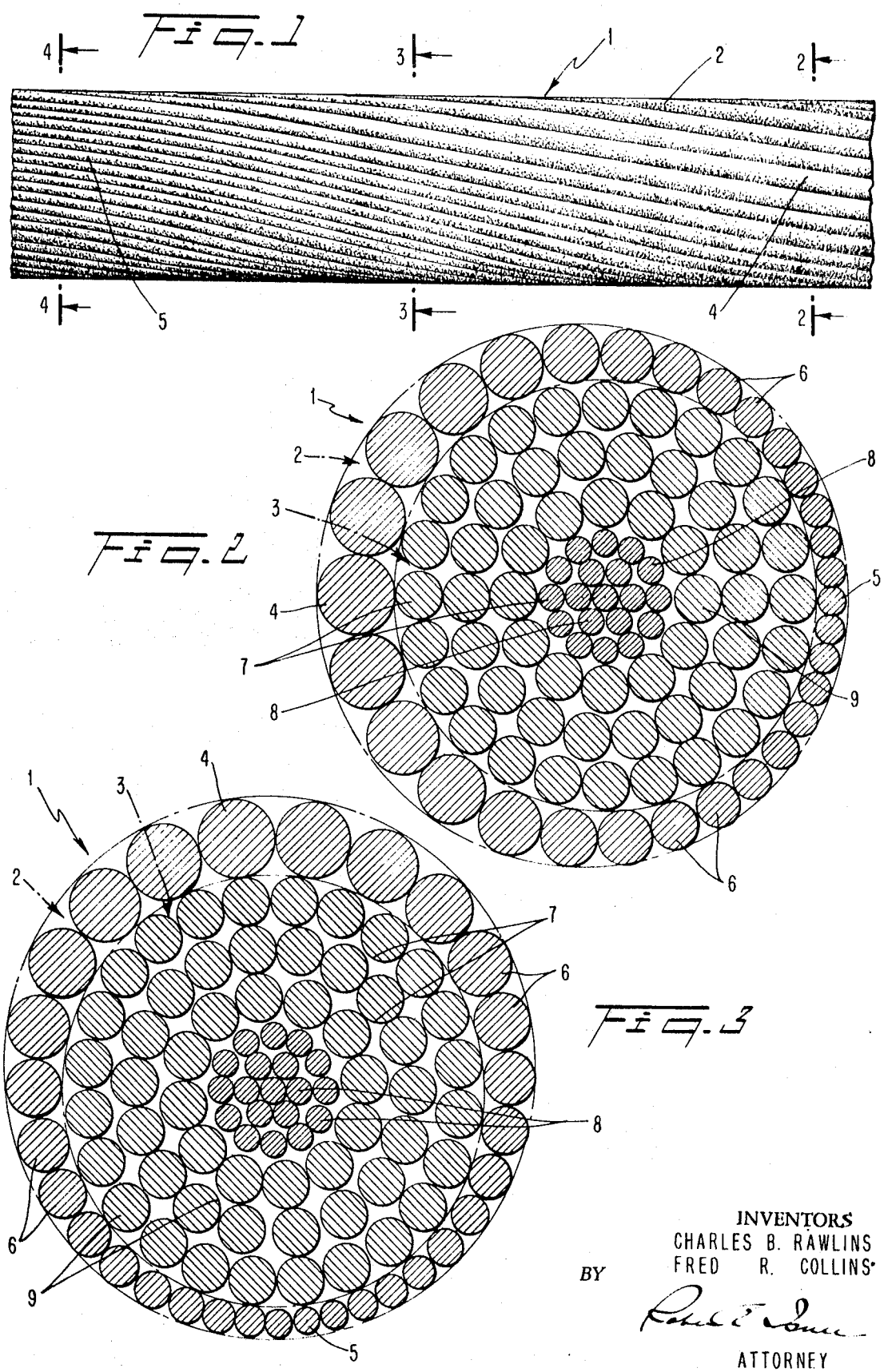

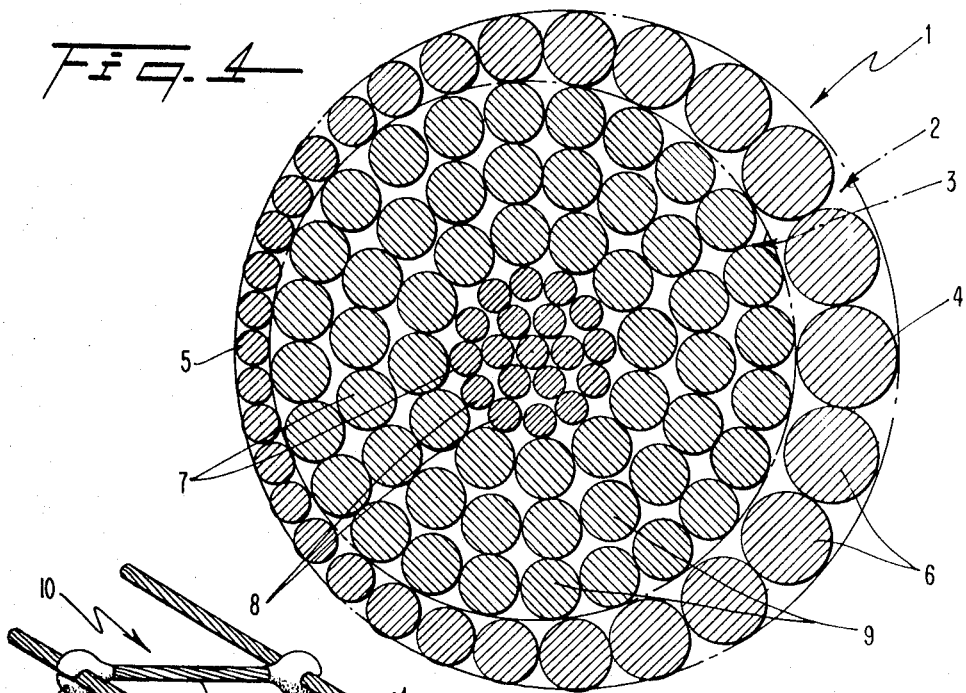
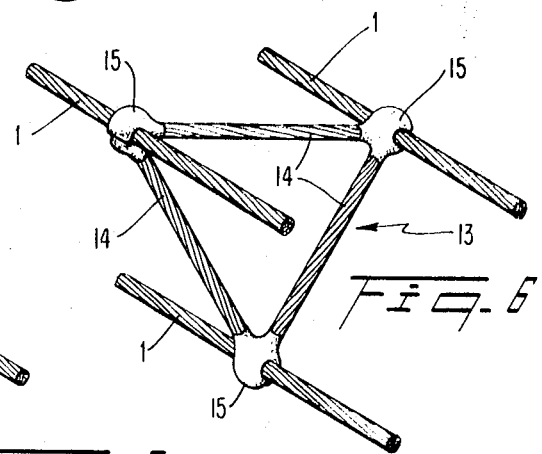
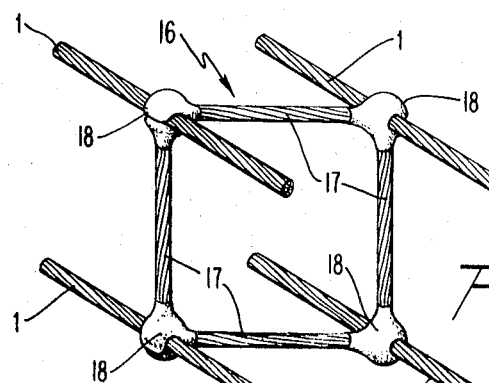
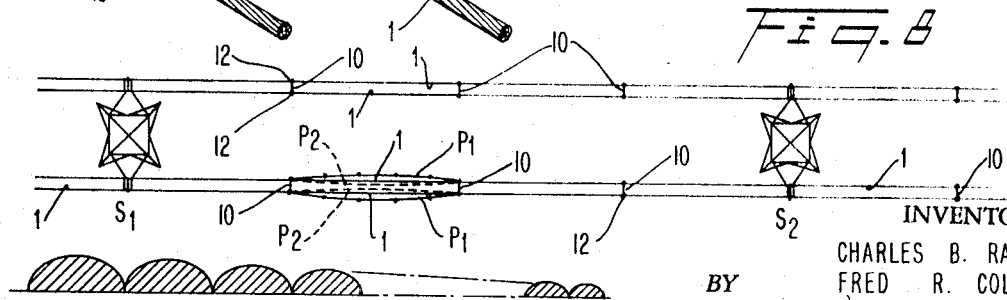

CONDUCTOR BUNDLE ARRANGEMENT

The present invention relates to a conductor bundle arrangement having a particular wire cable construction, and more particularly to an aerodynamically stable, minimum corona discharge, conductor bundle of conducting cable assemblies, each assembly having a substantially circular cross-sectionally shaped electrically conductive core and a sheathing layer having an exposed peripheral surface portion in the form of a multiplicity of adjacently disposed convex longitudinally extending ridges of progressively varying size helically disposed about the core, the sheathing layer preferably being formed of a multiplicity of adjacently disposed wires of progressively varying diameter helically laid about the core, and having a cross-sectional shape corresponding to that of an annulus, preferably an eccentric annulus, to provide a roughened covering surface with a longitudinally repetitive variation in surface roughness around the circumference thereof in accord with the helical disposition of the differing size ridges therein, and preferably in turn in accord with the helical lay of the differing diameter wires therein.

High-voltage overhead power transmission lines or cables during normal use are subject to various detrimental effects. These include corona loss, i.e. high-voltage ionization discharge into the air, concomitant radiofrequency interference caused by the radiation of radiofrequency signals inherently generated during such ionization discharge, as well as wind-induced high-amplitude oscillation and low-amplitude vibration of the power lines themselves.

Various modifications have been made of the high-voltage cables or conductors to minimize corona loss, either by increasing the overall size of the conductor or by providing the conductor with an insulating cover material of specific construction or design, e.g. having a higher dielectric value than that of the surrounding air. By including particular constructional features, for example a semiconductor layer, such covers may even reduce radio frequency interference. Such modifications, however, are costly and often cumbersome.

One the other hand, wind-induced oscillations and vibrations of the overhead cable or conductor, e.g. of lengths thereof suspended suitably between high towers, are caused by entirely different factors from those concerned with the nature of the power being carried by the conductor and which influence corona discharge and radio frequency interference. Depending upon the suspension arrangement and the wind conditions, e.g. flow velocity and direction, medium amplitude and low-frequency oscillations may occur which produce swaying and in turn galloping of a bare wire conductor, or low-amplitude and high-frequency vibrations may occur which produce corresponding stresses thereon.

Bare wire galloping or oscillation is normally considered to occur at very low frequencies, usually at swings of the cable of less than one cycle per second or hertz e.g. one-fourth hertz), yet at substantial magnitudes, e.g. several feet, so that the cable actually flies about in the wind. This is due to the aeroelastic instability of the bare wire cable associated with boundary layer transition from laminar to turbulent flow at appropriate wind velocities. Simple vibration or aeolian vibration is regarded as that which takes place at high frequencies, normally of more than 1 hertz (e.g. 2–200 hertz), but of relatively low amplitudes such as those corresponding to less than one cable diameter. This results from the generation and release of Karman vortices on the leeward side of the conductor at wind velocities below such boundary layer transition. Of course, the problems connected with bare wire galloping and with simple or aeolian vibrations are different and different approaches must be taken to minimize the mechanical stress and attendant adverse results on the cable or conductor brought about by each.

A further type of vibratory motion is iced conductor galloping, i.e. high-amplitude and low-frequency motion of ice-coated conductors due to the aeroelastic instability of the cross-sectional shapes formed by ice on the conductors at appropriate wind velocities.

One known cable construction modification concerns the utilization of a cover in the form of a uniform air foil to minimize turbulent air flow around the cable and concomitant wind-induced cable vibration, i.e. aeolian vibration, but this construction is not only prohibitively expensive but also unattractive from an esthetical standpoint.

Another conventional cable construction employs an outer layer of helically laid wires of graded size including at least three peripherally equidistant large wires between which are situated a plurality of smaller wires, the smallest of which are located peripherally midway between the appropriate large wires so as to achieve a regular polygonal or angular cross-sectional shape for the cable or conductor. Accordingly, the surface presented to the wind is such that air turbulence will be counterbalanced to some extent along the longitudinal course of the helically laid outer layer of wires and simple or aeolian vibration damping thereby achieved. However, because of the many repeating nodes of large wires per helical cycle corresponding to the at least three large wires required for the polygonal cross-sectional shape, corona discharge is intensified and conductor performance is degraded with regard to radio frequency interference as well. Specifically, the nodes or protuberances along the surface of the conductor cause the onset of unacceptable levels of corona and radio frequency interference to occur at a lower line voltage than for a conductor of the same cross-sectional area not having such protuberances. In order to attain the same line voltage, and hence the same power transmitting capacity, such protuberance-containing conductor must be made geometrically larger, i.e. of greater cross-sectional area and therefore of greater weight and cost, than a conductor not having such protuberances.

In experiments seeking to reduce the amplitude of high-frequency vibration or aeolian vibration, a small diameter single span conducting cable assembly construction has been suggested having a substantially circular cross-sectionally shaped electrically conductive core and a sheathing layer in the form of a multiplicity of adjacently disposed wires of progressively varying size helically laid about the core, the sheathing layer having a cross-sectional shape corresponding to that of an eccentric annulus, i.e. the area bounded by a pair of corresponding eccentric circles inwardly and outwardly combining the wires. However, there has been no appreciation that there would be any difference in the performance of such an assembly when subjected to conditions which would induce bare wire galloping or oscillation as opposed to simple or aeolian vibration.

It is known to be advantageous to string a number of smaller diameter conductors or subconductors in a bundle configuration rather than one large diameter conductor for a phase of an electrical transmission line. The number of smaller diameter conductors or subconductors used in the bundle is determined by the particular circumstances.

It is an object of the present invention to overcome disadvantages previously encountered and to provide a low cost, readily manufactured conductor bundle construction which is essentially self-dampling, or more precisely aerodynamically stable, especially regarding wind-induced bare wire galloping, so as to suppress cable oscillation, while at the same time being of a character which minimizes concomitant corona discharge and radiofrequency interference.

It is another object of the invention to provide a conductor bundle of adjacently disposed conducting cable assemblies, each conducting cable assembly having an electrically conductive, and also preferably mechanically strengthened, substantially circular cross-sectionally shaped core and a covering layer having an exposed peripheral surface portion in the form of a multiplicity of adjacently disposed convex longitudinally extending ridges of progressively varying size helically disposed about the core, the composite cross-sectional shape of the sheathing layer corresponding substantially to that of an annulus, preferably an eccentric annulus composed of progressively varying diameter wires helically laid about the core, so as to present to the wind an exposed roughened surface characterized by a longitudinally repetitive variation in the surface roughness around the circumference of the sheathing layer in accord with the helical disposition of the differing size ridges therein, and preferably in turn in accord with the helical lay of the differing diameter wires, whereby to dampen wind-induced bare wire galloping, or more precisely to provide aerodynamic stabilization against oscillation, of the cable assemblies in the conductor bundle without increasing concomitant corona discharge and radiofrequency interference.

Other and further objects of the invention will become apparent from a study of the within specification and accompanying drawing, in which:

FIG. 1 is a schematic side elevational view of a longitudinal portion of a wire cable construction for a conducting cable assembly of the conductor bundle arrangement in accordance with an embodiment of the invention illustrating approximately one-half of a helical cycle of the covering layer on the cable core;

FIGS. 2 and 4 are enlarged schematic cross-sectional views of the wire cable construction shown in FIG. 1, taken along the lines 2—2 and 4—4 thereof, respectively illustrating the disposition and configuration of the core and covering layer wires at helical positions of the covering layer 180° out of phase with each other;

FIG. 3 is an enlarged schematic cross-sectional view similar to those of FIGS. 2 and 4, but taken along the line 3—3 of FIG. 1 at an intermediate helical position of the covering layer 90° out of phase with the helical positions shown in FIGS. 2 and 4;

FIGS. 5 to 7 are schematic perspective views of overhead portions of two-conductor, three-conductor and four-conductor bundles, respectively, containing conducting cable assemblies of the type shown in FIGS. 1 to 4;

FIG. 8 is a schematic top view of a two-conductor bundle arrangement having the two conducting cable assemblies correspondingly suspended between longitudinally spaced apart suspension points; and FIG. 9 is a schematic partial cross-sectional view illustrating in linear projection the basic structural relationship of ridges or wires defining in composite silhouette a cycloidlike curvilinear configuration, of progressively decreasing cycloid-generating radius, corresponding to the exposed peripheral roughened surface portion of the sheathing layer of a conducting cable assembly of the conductor bundle in accordance with an embodiment of the invention.

It has now been found, in accordance with the the present invention, that a conductor bundle arrangement having a wire cable construction with increased aerodynamic stability and minimum corona discharge may be provided, in the form of at least two adjacently disposed conducting cable assemblies operatively interconnected to from such bundle, each conducting cable assembly including an electrically conductive core having a composite substantially circular cross-sectional configuration and a surrounding sheathing layer having a composite substantially annular cross-sectional configuration with an exposed peripheral surface portion in the form of a multiplicity of helically oriented and adjacently disposed outwardly convex longitudinally extending arcuate ridges of progressively varying size, said sheathing layer including at each transverse section thereof at least one first arcuate ridge of predetermined large size disposed at a first circumferential point and at least one last arcuate ridge of predetermined small size disposed at a second circumferential point in diametric relation therewith, and a plurality of intermediately disposed arcuate ridges of progressively smaller sizes than that of the said first ridge but larger than that of said last ridge adjacently disposed in the sheathing layer on each side of said at least one first ridge and occupying the remainder of the circumference thereof between said first and second points in corresponding substantially uniformly decreasing order of sizes in accord with the progressive peripheral remoteness thereof from said at least one first ridge, said exposed surface of the sheathing layer peripherally providing a composite silhouette characterized by a longitudinally repetitive variation in surface roughness around the circumference of the sheathing layer in accord with the helical disposition of the differing size ridges therein.

More specifically, the conductor bundle comprises at least two adjacently disposed longitudinally extending conducting cable assemblies correspondingly suspended between two longitudinally spaced-apart substantially fixed points and operatively interconnected by spacer means at least at one connecting point longitudinally intermediate said spaced-apart fixed points, each conducting cable assembly including an electrically conductive core having a composite substantially circular cross-sectional configuration and a sheathing layer formed of a multiplicity of adjacently disposed wires of progressively varying diameter helically laid about the core in covering relation therewith, said sheathing layer including at each transverse section thereof at least one first wire of predetermined large diameter disposed at a first circumferential point and at least one last wire of predetermined small diameter disposed at a second circumferential point in diametric relation therewith, and a plurality of intermediately disposed wires of progressively smaller diameters than that of said first wire but larger than that of said last wire adjacently disposed in said sheathing layer on each side of said at least one first wire and occupying the remainder of the circumference thereof between said first and second points in corresponding substantially uniformly decreasing order of diameters in accord with the progressive peripheral remoteness thereof from said at least one first wire and terminating in adjacent relation on each side of said at least one last wire, said sheathing layer having a composite cross-sectional configuration corresponding to that of an eccentric annulus and providing an exposed surface characterized by a longitudinally repetitive variation in surface roughness around the circumference thereof in accord with the helical lay of the differing diameter wires therein.

Referring to the drawing, and especially FIG. 1, a portion of an aerodynamically stable, bare wire conducting cable assembly 1 according to an embodiment of the conductor bundle arrangement of the invention is shown, with the sheathing layer 2 covering the electrically conductive core 3 (see FIGS. 2 to 4). Layer 2 is composed of a multiplicity of adjacently disposed, preferably round shaped, wires of progressively varying diameter helically laid about core 3, e.g. in side-by-side single-layer disposition, to provide a corduroy texture of variably sized, helically oriented and adjacently disposed, outwardly convex longitudinally extending arcuate ridges for the exterior surface of the cable assembly. Wire 4, which is disposed in layer 2 at a first circumferential point, i.e. as seen in transverse section, has a predetermined large diameter and wire 5, which is disposed in layer 2 at a second circumferential point in diametric relation with wire 4, has a predetermined small diameter. On the other hand, the plurality of remaining wires 6 adjacently disposed in layer 2 have progressively smaller diameters than that of wire 4 but larger than that of wire 5. Wires 6 are intermediately disposed on each side of wire 4 and occupy the remainder of the layer 2 circumference between the first and second points at which wires 4 and 5 are disposed. Wires 6 are arranged in corresponding substantially uniformly decreasing order of diameters (see FIGS. 2 to 4) in accord with their progressive peripheral remoteness from wire 4 along a given side of the exterior of the cable and terminate in adjacent relation on each side of wire 5, i.e. so as to occupy arc portions on the opposed halves of the sheathing layer surrounding corresponding opposed peripheral portions of core 3.

The sheathing layer 2 thus provides an exposed peripheral surface characterized by a longitudinally repetitive variation in surface roughness around the circumference thereof in accordance with the helical lay of the differing diameter wires therein. This variation in effective surface roughness around the girth of the assembly offers to the wind a helical corduroy texture or contour varying from coarse roughness to fine roughness along the extent from wire 4 to wire 5.

While only one large diameter wire 4 and only one small diameter wire 5 are shown in the drawing, it will be realized that more than one such large wire 4 and/or more than one such small diameter wire 5 may be provided, e.g. 2 or 3 of each such wires, so long as the small wires 5 are positioned in adjacency as a group at one circumferential point in diametric relation to a similar group of large wires 4 positioned in adjacency at a second circumferential point. Also, while only one wire 6 of a given diameter is shown in the drawing in each arc portion of intermediate wires between wires 4 and 5, in the same way, more than one such given diameter wire 6 may be provided, e.g. 2 or 3 such wires, so long as these are positioned in adjacency as a group among the remaining wires 6 in overall substantially uniformly decreasing order of diameters in each arc portion as noted above.

Core 3 may be of any suitable conventional design and is here shown (FIGS. 2 to 4) as a multistranded core containing several layers of, preferably round-shaped, wires 7. The innermost layers of wires in core 3 are normally composed of mechanically strengthened strands 8, preferably high tensile strength wires such as those of galvanized steel, while the remaining outer layers of core 3 are composed of highly conductive strands 9, such as relatively pure aluminum metal wires or aluminum alloy wires.

Core 3 is preferably formed with the innermost wires or strands 8 being centrally disposed within the outer wires or strands 9 so that the innermost and outer layers of the core are concentric along their longitudinal extent. Furthermore, core 3 should conveniently have a composite substantially circular cross-sectional configuration.

One the other hand, sheathing layer 2, because of the gradation of the diameters of the wires from the largest diameter wire 4 along each arc position of appropriate intermediate progressively smaller diameter wires 6 to the smallest diameter wire 5, is provided with a composite cross-sectional configuration corresponding substantially to that of an eccentric annulus. By an eccentric annulus is meant the composite cross-sectional area bounded by a pair of eccentric circles, the larger of which outwardly confines the wires of layer 2 and the smaller of which inwardly confines such wires, i.e. along the periphery of core 3.

As is clear from FIGS. 2 to 4, these eccentric circles are axially offset, i.e. the axes thereof are offset in the common plane thereof, a distance equal to the difference between the radius of the smallest wire 5 (or group of wires 5) and the radius of the largest wire 4 (or group of wires 4) in diametric relation therewith. Each of the circles is preferably of constant radius and the fabrication of the cable assembly is normally carried out with selectively sized differing diameter wires in layer 2 to provide such an eccentric annulus configuration in composite cross section. Even when using more than one wire 4 and/or 5 in a group and/or more than one wire 6 of a given size in a corresponding group, the produced cable assembly will still closely approach such eccentric annulus configuration in composite cross section.

Generally, the selectively sized differing diameter wires in layer 2 will be disposed in the form of such eccentric annulus, with the respective wires tangent along their common extent to both the larger and smaller circles of the eccentric annulus as shown in FIGS. 2 to 4. While slight out-of-round cross-sectional configuration may exist for the composite cross-sectional shape of each cable assembly of the conductor bundle of the invention, depending upon the selection of the varying diameters of wires 6, this will be minimized by reason of the use of a circular apertured cable laying or forming die through which the core and helically disposed wires of the sheathing layer are passed during the fabrication of the cable assembly, especially for the step of helically laying the varying diameter wires of the sheathing layer onto the core. A very tight fit is thereby achieved and the wires of the sheathing layer are not only closely disposed to one another throughout their repeating spiral convolutions, preferably in touching engagement along their common length, but also closely disposed to the adjacent peripheral wires of the stranded core therebeneath throughout such repeating spiral convolutions, again preferably in touching engagement along their common lengths where the succeeding layers of wires in the composite cable are laid in substantially the same helical direction or at their common points of contact where the succeeding layers of wires in the composite cable are laid alternately in opposite helical directions. To the extent that such touching engagement is achieved, some damping of vibratory motion will occur, due to the frictional resistance of the tightly laid wires in the sheathing layer and in the core, so as to suppress displacement by wind forces of the cable out of its normal trajectory, e.g. when suitably suspended in appropriate lengths in the form of a conductor bundle arrangement between high tension towers or the like.

Because of the manner of fabrication of the core and sheathing layer, in the case of the eccentric annulus cross-sectional configuration embodiment, especially with the use of a round apertured cable-laying die, the core is sufficiently hard to force the wires in the sheathing layer into helically eccentric position along the longitudinal extent of the core. This slight helical eccentricity is due to the fact that in this embodiment the eccentric annulus configuration will reverse itself in every half phase of the spiral or helical lay of the sheathing layer on the core as the diametric positions of the large large wire 4 and small wire 5 reverse themselves correspondingly 180° with each such half phase as shown in FIGS. 2 and 4, i.e. after passing through an intermediate helical position as shown in FIG. 3 which is 90° out of phase with the helical positions shown in FIGS. 2 and 4. This pattern of helical eccentricity superimposed on the repetitive corduroy surface patterns of the gradually changing diameter wires in the sheathing layer will enhance the reduction of wind-induced vibration because of the multiple faces, i.e. variable texture, presented to the wind at any angle of attack of the wind on the cable assembly in question, considering the very tight lay of the sheathing layer wires on the core. A cancelling out of the various wind forces will inherently take place.

By reason of the use in the sheathing layer of at most two or three large diameter wires 4 in adjacency as a group at one circumferential point, and preferably only one such large diameter wire, and complementary graded intermediate diameter wires 6 of substantially uniformly decreasing order of diameters down to the at most two or three smallest diameter wires 5 in adjacency as a group at a second circumferential point, and preferably only one such smallest diameter wire, in diametric relation to such large diameter wire, the closest practical approach to a substantially circular cross-sectionally shaped outer periphery is achieved for the cable. This minimizes corona discharge. It is well recognized that corona discharge increases as the cable progressively deviates from a round or circular cross-sectional gross shape, i.e. in bare wire cables of the type contemplated herein. Such deviation increases the voltage gradient at the conductor surface (and in turn the propensity for corona discharge) relative to the corresponding voltage gradient of a round cross-sectionally shaped conductor with the same girth. Even though a large diameter wire or group of such wires in adjacency is present in the instant sheathing layer, the tendency thereof to cause corona discharge is offset by the provision for graded sizes for the remaining wires down to the smallest wire or group of smallest wires in adjacency in conjoint relation to the particular size of such largest wire or wires. This results in a smoother rounding of the overall circumferential shape for the closest possible approach to ideal circularity. This would not be so if the sheathing layer included a multiplicity of wires of differing diameters in a size sequence differing from the uniform or graded transition sequence contemplated herein.

Of course, while corona discharge can also be minimized by providing the cable in question with an insulating cover of the conventional type, this represents a remote constructional modification with respect to the bare wire cable assembly contemplated by the conductor bundle arrangement of the present invention and one which cannot also achieve thereby damping of cable oscillation. Furthermore, the providing of such conventional insulating cover constructions is usually attended by degradation of strength-to-weight ratio of the assembly as well as more costly and cumbersome manufacturing techniques, both of which tend to offset the minimized corona discharge benefits obtained.

Since the phenomenon of radiofrequency interference results from corona discharge, the constructional configuration of the cable assembly of the conductor bundle of the invention, especially because of the substantially round or circular composite cross-sectional shape thereof, in the same way serves to minimize radiofrequency interference as well, compared with that of conventional bare wire cables in which damping of cable oscillation is sought. While the variation in wire diameters in the sheathing layer produces a desired variation in surface texture, this has little adverse influence on radiofrequency interference performance of the cable.

Moreover, the versatility of the instant construction is such that the size, i.e. overall diameter, of the composite conductor cable of the bundle can be selectively determined almost entirely by considerations of corona discharge and radiofrequency interference, whereby to minimize these adverse characteristics without detracting from the aerodynamic stabilization of the subject cable bundle construction. Advantageously, by providing sufficiently large overall diameter cable assemblies according to the bundle construction of the invention, the voltage gradient at the conductor surface can be kept below a given critical value relative to corona discharge and radiofrequency interference for minimum power loss.

FIG. 5 shows a conductor bundle according to the invention having a pair of adjacently disposed longitudinally extending conducting cable assemblies 1 correspondingly suspended between two longitudinally spaced-apart substantially fixed points (cf. FIG. 9) and operatively interconnected by spacer means 10 in the form of spacer member 11 normally maintaining the assemblies 1 in substantially constant laterally spaced-apart parallel relation via the end clamps 12 which respectively clampingly engage a portion of the girth or circumference of the assemblies 1.

FIG. 6 shows a three-conductor bundle having three adjacently disposed longitudinally extending cable assemblies 1 similarly suspended between two longitudinally spaced-apart substantially fixed points (not shown) and operatively interconnected by spacer means 13, depicted in the form of a triangular set of spacer members 14 for normally maintaining the assemblies 1 in the desired spaced-apart relation via the corresponding apex end clamps 15. Preferably, the spacer members 14 form an equilateral triangle and the bundle is arranged so that the triangle projection formed by the conductor assemblies points toward the ground.

FIG. 7 covers a four-conductor bundle arrangement having four adjacently disposed longitudinally extending cable assemblies 1 suspended between two longitudinally spaced-apart substantially fixed points (not shown). In a similar way, spacer means 16, for instance in the form of the quadrangular set of spacer members 17, operatively interconnect the assemblies 1 via angle clamps 18 for normally maintaining them in the intended spaced-apart relation.

Various spacer means constructions of the foregoing types are well known and often the corresponding spacer members are resiliently arranged to contribute some damping effect towards vibrations which occur in the conductors of the bundle. Usually, a plurality of spacer means are provided at spaced apart intervals along the extent of the suspended conductors of the bundle to form corresponding subspans, especially where the suspended conductor bundle has a very long overall span.

By way of the present stranded conductor cable construction, characteristics are imparted to the cable bundle arrangement which especially prevent the type of aerodynamic instability that causes galloping or dancing of uniced bare wire conductors. Under normal, uniced conditions, as distinguished from ice-coated conductors as discussed above, the sheathing layer of each bare wire cable of the instant bundle presents to the wind a variation in effective surface roughness about the roundlike cable girth in a repeating pattern according to the spiral or helical configuration thereof which dampens bare wire galloping, or stated another way aerodynamically stabilizes the particular bare wire cable against oscillation.

In this regard, the phenomenon known as bare wire galloping or oscillation is understood to be associated with a transition that takes place in the coefficient of drag of cylindrical bodies oriented generally crosswise to the flow of a fluid. Within a certain transition range of Reynolds Numbers (which are a direct function of flow velocity), the drag coefficient decreases as the Reynolds Number increases. Consequently, in such range, drag itself increases with velocity of flow less rapidly than if the drag coefficient were constant. If the drag coefficient were constant, drag would very as the square of flow velocity. Under some conditions, the drag coefficient may fall so rapidly, as the Reynolds Number increases within this transition range, that drag itself decreases as flow velocity increases. Bare wire galloping may occur when this last situation obtains.

To wit, when the cylindrical body is suitably suspended, it may oscillate towards and away from the wind. As the cylindrical body moves into the wind, its greater velocity with respect to the wind results in less drag by the wind than is felt when the cylindrical body moves away from the wind and hence has a smaller velocity with respect to the wind. The net effect is that the average drag force imposed upon the cylindrical body has superimposed upon it an incremental force that assists the body in whichever direction, into or away from the wind, it happens to be swinging.

When the cylindrical body is a suitably suspended stranded conductor, i.e. bare wire cable, or the like, having a helical layer of strands for its outer surface, an additional force may come into play. In particular, when the cable is not oriented perpendicular to the wind, a lift force may occur transverse to the wind direction and to the axis of the cable. This lift force results from an asymmetry in the oblique flow around the cable arising from the apparent difference in roughness encountered by the air on the two sides; the wind flows on one side more nearly parallel to the helical strands than on the other.

This lift force occurs within the transition range of Reynolds Numbers mentioned above, and its magnitude varies as the Reynolds Number passes through this transition range. Since this is the case, oscillation of the cable towards and away from the wind, as described above, may cause periodic variation in the lift force because the variation in streamwise movement of the oscillating cable causes variation in the velocity of flow with respect to the cable and hence a variation in the effective Reynolds Number. The periodic variation in lift may result in vertical oscillation of the cable, simultaneous with the horizontal, streamwise oscillation so as to cause bare wire galloping.

Appreciation of the cable assembly construction of the conductor bundle arrangement of the present invention requires an understanding of the above mentioned transition phenomenon. The transition in question is accompanied by a change in the pattern of the fluid flow in the vicinity of the cable. Specifically, the flow in the boundary layer, which is the layer of fluid adjacent to the cable surface, changes from laminar to turbulent during the transition. Hence, as the flow velocity or Reynolds Number is increased from a value below the transition range to a value above it, the flow in the boundary layer changes from fully laminar flow, to a mixture to laminar and turbulent flow, and finally to a fully turbulent flow. This change brings with it changes in surface pressures on the cable that result in a decrease in the drag coefficient as discussed above.

The values of the Reynolds Number at which transition begins and ends depend upon the roughness of the cylindrical surface, e.g. the bare wire cable. The onset of turbulent boundary layer flow is assisted by such roughness. Hence, transition occurs at lower Reynolds Numbers for rough cylindrical bodies or cables than for smooth ones. More particularly, the degree to which onset of turbulent boundary layer flow is assisted by roughness, i.e. the amount by which the transition Reynolds Number range is shifted towards smaller Reynolds Numbers, is determined by the texture or degree of coarseness of the surface roughness. Hence, coarse roughness lowers the transition Reynolds Number range more than fine roughness.

When there is a difference in roughness between the top and bottom of a horizontal cylindrical body or cable in a horizontal fluid flow, transition may occur on the top thereof at a different Reynolds Number than on the bottom. The difference in pressure of the two flow patterns, top and bottom, results in lift. As aforesaid, this difference in roughness may simply be that caused by a yawed or oblique wind, i.e. one not perpendicular to the cable, flowing more nearly parallel to the strands on one side thereof than on the other.

Significantly, the rapidity of transition, that is, how rapidly the drag and lift coefficients change with changing Reynolds Number, is crucial in determining whether bare wire galloping will occur. A given amount of cable motion will generate sustaining forces in proportion to these rates of change. If the rates of change are per se too small, bare-wire galloping will not occur, or if not per se too small yet small enough that the variations in force cannot overcome frictional forces in the system, bare-wire galloping will still not occur.

On the other hand, aside from these last two threshold situations, bare-wire galloping can be avoided by the bare-cable assembly containing bundle arrangement of the present invention in terms of the reduction of the rates of change of the drag and lift coefficients with respect to the Reynolds Number by causing transition to occur within different ranges of the Reynolds Number at different locations on the cable surface, so that transition for the cable as a whole will be spread over a broad range of Reynolds Numbers. The dispersion in the transition Reynolds Numbers is brought about by the variations in effective surface roughness around the girth of the bare-wire cable assemblies of the bundle arrangement of the invention resulting from the particular sequence of graded sizes of strands in the outer or sheathing layer of each such cable assembly which range from coarse roughness to fine roughness. This variable texture or corduroy texture of varying roughness (from coarse to fine), e.g. represented by the progressively decreasing strand size from the at least one large diameter or effective width wire down to the diametrically opposed at least one small diameter or effective width wire, is basic to the advance of the present invention.

Specifically, where a conductor or cable has an outer layer of helically laid wires, bare-wire galloping can occur when the flow direction of the wind in said transition range is oblique to the conductor or cable axis. Such oblique flow creates an air foil, or more precisely a flow regime, peculiar to the asymmetrical airflow around the periphery of the cable which is a result of the wind travelling along one side of the cable in a path substantially parallel to the lay of the wires while travelling along the other side in a path substantially perpendicular to the lay of the wires. Where the wires are of uniform size, the flow regime and consequent lift force tends to be uniform along the cable. In the case of the instant construction, however, such flow regime is disrupted since the wind, i.e. airflow, encounters alternately rough and smooth (coarse roughness to fine roughness) peripheral cable areas resulting from the presence of differing graded wires in the sheathing layer. These differing diameter wires cause different lift forces to occur along the helix of the cable which offset one another and become dissipated. The instant cable-containing bundle construction will thus self-dampen or aerodynamically stabilize any tendency to oscillation, i.e. bare-wire galloping.

Because of the corduroy texture of the surface of the sheathing layer, therefore, no uniform or common flow regime is presented to the wind which might cause lifting of the cable, but instead a repetitively varying flow regime exits which cancels out any lift component of the wind which would induce bare-wire galloping. Aside from this, the repeating helical cycle of the annular configuration sheathing layer, having therein perhaps two or three such large wires 4 in abutting adjacency, and preferably only a single large wire 4, presents more uniform girth to the wind and less frequent large wire nodular repetition than occur where several spaced-apart large wires are disposed in the sheathing layer as in the conventional cable of polygonal composite cross-sectional configuration.

Hence, by providing preferably only one large diameter wire 4 in conjunction with the remaining wires 6 graded in size uniformly on both half arcs of the sheathing layer down to the preferably only one smallest diameter wire 5, advantageously, there is a longitudinal localization of the transition phenomena associated with changes in the Reynolds Number, which cause bare-wire galloping as discussed above. These transition phenomena normally spread along the cable to areas that otherwise are not affected by such phenomena so as to intensify and propagate the bare-wire galloping effect. With a multiple number of spaced-apart large diameter nodular wires in the sheathing layer as occurs in the case of the above mentioned conventional polygonal cross-sectional configuration construction, the greater frequency of large nodes corresponding to such large wires for a given cable length will not only intensify corona discharge and radiofrequency interference, as aforesaid, but also will offer to the wind a correspondingly greater frequency of similarly configured differentiated areas per helical cycle which are subject to such transition phenomena associated with Reynolds Number changes and which will enhance the spreading thereof along the cable to such areas otherwise not affected and thus propagate bare-wire galloping. In contrast thereto, the group of at most two or three large diameter wires in adjacency, and preferably the single large diameter wire, in the sheathing layer of the present construction, as aforesaid, presents correspondingly only one such node or differentiated area to the wind suitably buttressed by the remaining wires graded to provide the, preferably eccentric, annulus in question with increased distance between repeating nodes and concomitant smooth and roughened areas (coarse roughness to fine roughness) as the helix varies so as to isolate and confine the transition phenomena to the areas directly affected and stabilize the cable assembly against bare-wire galloping. Consequently, an increased damping effect is provided inherently in the instant construction over that provided in the case of such conventional polygonal configuration cable.

By way of further explanation, it has been found that bare-wire galloping or oscillation occurs almost exclusively in overhead spans of conductor bundles as opposed to single conductor spans. This is believed to be traceable to the fact that the oscillation in question is a vibration of the self-excited type. For self-excited vibration to occur, there must be sufficient vibration present to supply energy to sustain the vibratory motion, and concomitantly there must be provision for storing vibration energy from one cycle to the next.

By analogy, in the playing of a trumpet, a self-excited vibration is set up by the alternate closing and opening of the trumpeter's lips in the mouthpiece of the instrument. However, this rapid opening and closing is not voluntary or controlled by the trumpeter, but instead is controlled by the presence of pressure fluctuations in the tube of the trumpet acting back against the trumpeter's lips. The lips cannot open and close properly without the presence of this oscillation back pressure. Thus, vibration must be present in order for the vibration to continue, and the required vibration energy is stored within the tube of the trumpet in the form of a standing wave of sound. Since such energy is lost by its emission from the bell of the trumpet, the rate of energy loss through this exit must be adapted that enough remains stored to control the flutter of the trumpeter's lips. If the loss were too rapid, the trumpeter would not be able to achieve a self-excited vibration because the reservoir of stored energy would be too small to provide the controlling fluctuations in pressure against his lips.

With regard to overhead conductors, in order for oscillation of the type in question to occur, there must be provision for such storage of vibration energy so that vibration will be present to control the aerodynamic forces upon the conductor to bring about self-excitation. While there is provision inherently for the efficient storage of vibration energy, with small loss, in bundle conductors by reason of their suspension arrangement in more or less isolated longitudinally successive spans, this is not true for single conductor spans.

FIG. 8 shows schematically from above an overhead span of a horizontal two-conductor or subconductor bundle according to the invention in which two adjacently disposed longitudinally extending conducting cable assemblies 1 are correspondingly suspended between two longitudinally spaced apart substantially fixed suspension points S and S and operatively interconnected by a plurality of spacer means 10 at spaced connecting point intervals longitudinally intermediate the suspension points $S_1$ and $S_2$. Of course, such bundle can contain three, four or more conductor assemblies therein if desired (cf. FIGS. 5 to 7). Schematically illustrated between two adjacent spacer means 10 is a subspan portion of the bundle theoretically undergoing bare-wire galloping or oscillation. The oscillation is confined to the one subspan portion of the bundle, although of course all of the subspans may be individually undergoing oscillation depending on the wind condition. As long as the two conductors, i.e. conductor assemblies 1, move at the same amplitude and frequency, but in opposite phases, between position $P_1$ at time T and position $P_2$ one-half cycle later, so that both conductors occupy position $P_1$ simultaneously and then occupy position $P_2$ simultaneously, the forces acting on the adjacent spacer means 10 that limit the oscillating subspan continually balance out and thus add up to zero. The spacer means 10 therefore remain stationary, and there is no tendency for vibration energy to be transmitted to the adjacent subspans but instead such energy is inherently stored within the subspan in question. This situation is easy to obtain because normally the parallel subconductors 1 in the same subspan are exactly the same in length and are carefully matched as to tension. Each conductor bundle subspan is therefore functionally isolated, i.e. vibrationwise, from the adjacent subspans.

On the other hand, in overhead single conductor spans, isolation between adjacent spans would be difficult to achieve because the adjacent spans are rarely of exactly the same length between the successive longitudinally spaced apart substantially fixed suspension points, and often these spans have slightly different tensions. In fact, to achieve complete isolation in any one span of a line, for example between deadend towers, it would be necessary for all of the spans in the section between such deadend towers to be oscillating at the same amplitude and frequency. For this to occur, equality in span length and tension would have to be achieved for a number of longitudinally adjacent spans rather than only for two parallel conductor or subconductor subspans as in the case of the two-conductor bundle shown in FIG. 8.

Furthermore, the likelihood of the occurrence of wind conditions which would induce bare-wire galloping or oscillation over a length of line encompassing several complete spans is much less than for the occurrence of those conditions over the subspan length within one span of a conductor bundle.

Achieving a net zero force at the supports between adjacent single conductor spans would be important for bare-wire galloping or oscillation to occur, because of the energy lost to the distortion of tower structures (representing the substantially fixed suspension points) that would occur were a net force left at any such support point. In the case of spans supported at the support points by single strings of insulators, a remaining net force at a given support point would result in movement at that point, and thus prevent isolation between adjacent spans.

Although it is apparent from the foregoing that single-conductor span arrangements by their very nature do not suffer from bare-wire galloping or oscillation since vibration energy cannot be adequately stored, conductor bundle arrangements are often preferred thereover because of certain advantages attendant their use despite the serious disadvantages brought about by their inherent susceptibility to bare-wire galloping or oscillation. Nevertheless, surprisingly, the specific conductor bundle arrangement of the present invention prevents the type of aerodynamic instability that causes bare-wire galloping or oscillation by reason of the inclusion therein of the instant conducting cable assemblies. In fact, concomitant oscillation damping effect is obtained by way of the instant conductor bundle arrangement which is comparable to that resulting from the separate use of special damping spacer means for the cables of a conventional bundle arrangement.

Generally, in this regard, the conducting cable assemblies of the instant conductor bundle will all have the same diameter, e.g. 1.1 inch or larger diameter, and especially 1.5 to 1.6 inch diameter, for better control of corona discharge and radiofrequency interference. Since the Reynolds Number is proportional to the product of the wind velocity and conductor or subconductor diameter, transition will occur within the range of wind velocities to which these conducting cable assemblies are normally exposed, making the bundle arrangement susceptible to bare-wire galloping or oscillation. For instance, transition occurs for a 1.6 inch diameter conductor cable at a wind velocity of about 30 m.p.h. Nevertheless, as discussed above, bare-wire galloping or oscillation will be suppressed in the conductor bundle arrangement of the invention due to its unique construction.

A further advantage of the present construction over such conventional polygonal cable construction is the fact that the instant sheathing layer more effectively resists through internal frictional forces the tendency of the cable to undergo oscillation, and thus dampens such oscillation, because such layer is helically laid more tightly about the core than is possible with the conventional polygonal cable design. In this regard, the closest approach to peripheral roundness provided by the gradation of wires in the instant sheathing layer permits such wires to be forced together more tightly as they are helically laid about the core in the cable forming die. On the other hand, when fabricating the conventional polygonal cable, valleys are formed in the peripheral areas between the plural large diameter wires which permit the smaller intermediate wires to be displaced radially outwardly or pop out of their intended position during passage through the cable forming die. The formation of such valleys is minimized and the tendency of the smaller wires to pop out of their intended radial position avoided in the case of the instant more circular cross-sectional cable. This is true since the more circular peripheral configuration presented to the cable forming die is more readily accommodated therein with the sheathing layer wires more uniformly engaging the die inner surfaces to provide a tighter sheathing layer around the core than is possible in the case of the conventional polygonal construction.

Of course, by keeping the shape essentially round in cross section, rather than polygonal or otherwise, the instant cable assemblies can also be accommodated more readily by standard type clamps and other cable accessories which engage the cable around its girth. Normally, such clamps and accessories have round openings or cable engaging surfaces and the more uniform fit of the instant essentially round girth cable therewith will provide a more uniform distribution of the mechanical pressure exerted on the cable by dint of the connection thereat.

In accordance with a specific embodiment of the present invention, each self-damping conductor cable assembly of substantially round composite cross-sectional shape contained in the bundle arrangement is composed of helically laid essentially round cross-sectioned wires in ordinal sequence of layers from a single center strand radially outwardly to the peripheral sheathing layer, as shown in the following table (in which G.S. Galvanized Steel and E.C. Alum. Electrically Conductive Aluminum Metal):

Table 1

|  | Layer No. | Material | No. of Strands | Strand Diam. (inches) |
|---|---|---|---|---|
| Core | 0 (Center) | G.S. | 1 | 0.1456 |
| Core | 1 | G.S. | 6 | 0.1456 |
| Core | 2 | G.S. | 12 | 0.1456 |
| Core | 3 | E.C. Alum. | 24 | 0.1456 |
| Core | 4 | E.C. Alum. | 30 | 0.1456 |
| Sheathing Layer | 5 | E.C. Alum. | *30 | * |
| | | | *made up as follows: | |
| | | | 1 | 0.199 |
| | | | 2 | 0.190 |
| | | | 2 | 0.182 |
| | | | 2 | 0.174 |
| | | | 2 | 0.167 |
| | | | 2 | 0.160 |
| | | | 2 | 0.153 |
| | | | 2 | 0.146 |
| | | | 2 | 0.140 |
| | | | 2 | 0.134 |
| | | | | 0.128 |
| | | | 2 | 0.122 |
| | | | 2 | 0.117 |
| | | | 2 | 0.112 |
| | | | 2 | 0.107 |
| | | | 1 | 0.102 |

The 30 strands in the sheathing layer, having essentially a composite cross-sectional shape corresponding to that of an eccentric annulus, when considered in clockwise direction starting with the large diameter strand, may be listed as follows:

Table 2

| | Strand Diam. (inches) |
|---|---|
| Larger diameter strand | 0.199 |
| | 0.190 |
| | 0.182 |
| | 0.174 |
| | 0.167 |
| | 0.160 |
| | 0.153 |
| Intermediate strands in first half arc | 0.146 |
| | 0.140 |
| | 0.134 |
| | 0.128 |
| | 0.122 |
| | 0.117 |
| | 0.112 |
| | 0.107 |
| Small diameter strand | 0.102 |
| | 0.107 |
| | 0.112 |
| | 0.117 |
| | 0.122 |
| | 0.128 |
| | 0.134 |
| Intermediate strands in second half arc | 0.140 |
| | 0.146 |
| | 0.153 |
| | 0.160 |
| | 0.167 |
| | 0.174 |
| | 0.182 |
| | 0.190 |

It will be realized of course that the concept of the present invention broadly envisions for the bundle arrangement the inclusion of a surrounding sheathing layer of composite substantially annular cross section configuration on the corresponding bare-wire cable core which retains essentially a circular composite cross-sectional configuration for each assembly and at the same time provides an exposed peripheral surface portion in the form of a multiplicity of helically oriented and adjacently disposed outwardly convex longitudinally extending arcuate ridges of progressively varying size, such that in composite silhouette corresponding to the ridges a cycloidlike curvilinear configuration (or convexly arcuate peripheral shape) extends from the at least one large-size ridge on each side to the at least one small-size ridge characterized by a longitudinally repetitive variation in surface roughness around the circumference of the sheathing layer in accord with the helical disposition of the differing size ridges therein.

Hence, the resulting variation in effective surface roughness around the periphery of each assembly offers to the wind an aerodynamically stabilizing helical corduroy texture or contour varying from coarse roughness at the circumferential point at which the at least one first ridge (or wire) or predetermined large size (or wire diameter) is disposed, to intermediate roughness along each side containing the intermediately disposed ridges (or wires) of progressively smaller sizes (or wire diameters), to fine roughness at the diametrically opposed circumferential point at which the at least one last ridge (or wire) of predetermined small or smallest size (or wire diameter) is disposed.

FIG. 9 illustrates the broad concept of the exposed peripheral surface portion of the sheathing layer. The linear projection of FIG. 9 shows in composite silhouette a cycloidlike curvilinear configuration corresponding to the ridges which has a progressively decreasing cycloid-generating radius. The progressive decrease in the size of the radius used to generate the sequential cycloidlike configuration on each arc half of the sheathing layer varies in accord with the size of the particular ridges in questions. Such ridges, or the individual cycloidlike elements, or part circle elements, or the like, making up the sequential cycloidlike configuration, may be considered as radially outwardly directed convex corduroy ribs or convexly arcuate ribs. Of course, the linear projection of FIG. 9 is intended as a schematic showing only, since in fact the exposed peripheral surface portion corresponds to the circumference of the sheathing layer, i.e. that of the outer circle of the annulus in question.

Structurally, the sheathing layer may be formed to achieve the foregoing silhouette or configuration in the exposed peripheral surface portion, by providing substantially round cross-sectional wires or strands of varying diameters, in which case the sheathing layer will assume the composite cross-sectional shape of an eccentric annulus as described above.

Such silhouette or configuration can also be achieved, in accordance with an alternate embodiment of the invention, by providing wires or strands having a flattened underside along the portion thereof facing the periphery of the core therebeneath, for example, as depicted in cross section by the area bounded between a chord or secant and the circumference of a circle corresponding to the effective diameter of the flattened underside wires, with the chord or secant defining such flat underside. These flattened underside wires may be provided along a portion of or throughout the entirety of the arc half periphery from the at least one first ridge to the at least one last ridge, on each side of the sheathing layer. By suitable selection of effective wire diameters and concomitant chord or secant intersecting positions corresponding to the flattened undersides of the wires, the sheathing layer will assume the composite cross-sectional shape of a concentric annulus yet the overall peripheral contour of the assembly will remain circular while the surface roughness will vary from coarse roughness to fine roughness as described above.

In this alternate embodiment using flattened underside wires, depending upon the selected wire diameters, the selected total number of wires in the sheathing layer in side by side disposition, and the selected composite width of the sheathing layer, the portion of flattened underside wires can be less than all, such that some of the wires will be of the usual circular or round cross-sectional types, e.g. those in the vicinity of the circumferential point at which the at least one small wire is disposed, while others will be of the flattened underside type, e.g. those in the vicinity of the diametrically opposed circumferential point at which the at least one large wire is disposed. In this instance, the intermediate wires will progressively decrease in flatness area in accord with the progressive peripheral remoteness thereof from the at least one large wire.

To maintain the concentric relation of the annulus, the height of each wire must be the same, i.e. the linear distance of the center line normal to the chord or secant defining the flattened wire underside and extending from such chord or secant to a line tangent to the outermost periphery of such wire must be essentially the same for all of the flattened underside wires even though such wires will vary progressively in terms of individual chord or secant length corresponding to the individual wire size or effective diameter. Moreover, this linear distance will also be essentially equal to the diameter of the at least one small, i.e. smallest, wire diametrically opposed to the at least one large, i.e. largest, wire, in order to preserve the concentric annulus cross-sectional configuration for the sheathing layer.

Regarding the foregoing, by a concentric annulus is meant the composite cross-sectional area bounded by a pair of concentric or coaxial circles, the larger of which outwardly confines the wires, ridges, or the like, of the sheathing layer and the smaller of which inwardly confines such wires or the underlayment or remainder of the sheathing layer, i.e. along the periphery of the core of the assembly.

Naturally, in the light of the disclosure hereinabove, it will be apparent to the skilled artisan that other forms of sheathing layer construction, both of the eccentric and concentric annulus types, i.e. or ringlike composite cross-sectional shape, can be provided so as to achieve a cable assembly for the instant bundle arrangement having a composite substantially circular cross-sectional configuration, with the sheathing layer having an exposed peripheral surface portion in the form of a multiplicity of helically oriented and adjacently disposed radially outwardly convex longitudinally extending arcuate ridges of progressively varying size providing a composite silhouette characterized by the longitudinally repetitive variation in surface roughness as discussed above.

One such other form of sheathing layer construction can be a ridged covering, e.g. of insulating material such as a suitable plastic material, disposed around the core and having a helical corduroy texture exterior corresponding to said exposed peripheral surface portion of ridges of varying roughness from coarse roughness to fine roughness (see FIG. 9) carried by an underlayment, substrate, or the like, representing the remainder of the sheathing layer adjacent the core. Such an insulating ridged covering provides two distinct benefits, namely aerodynamic stabilization and corona discharge minimization, which conjointly more than compensate for any degradation of strength-to-weight ratio and/or increased manufacturing costs attendant the use of such type of covering.

It will be appreciated that the instant specification and drawings are set forth by way of illustration and not limitation, and that various modifications and changes may be made without departing from the spirit and scope of the present invention which is to be limited only by the scope of the appended claims.

What is claimed is:

1. A conductor bundle arrangement comprising at least two adjacently disposed conducting cable assemblies operatively interconnected to form a conductor bundle, each conducting cable assembly including an electrically conductive core having a composite substantially circular cross-sectional configuration and a surrounding sheathing layer having a composite substantially annular cross-sectional configuration with an exposed peripheral surface portion in the form of a multiplicity of helically oriented and adjacently arcuate ridges of progressively varying size, said sheathing layer including at each transverse section thereof at least one first arcuate ridge of predetermined large size disposed at a first circumferential point and at least one last arcuate ridge of predetermined small size disposed at a second circumferential point in substantially diametric relation therewith, and a plurality of intermediately disposed arcuate ridges of progressively smaller sizes than that of said first ridge but larger than that of said last ridge adjacently disposed in the sheathing layer on each side of said at least one first ridge and occupying the remainder of the circumference thereof between said first and second points in corresponding substantially uniformly decreasing order of sizes in accord with the progressive peripheral remoteness thereof from said at least one first ridge, said exposed surface of the sheathing layer peripherally providing a composite silhouette characterized by a longitudinally repetitive variation in surface roughness around the circumference of the sheathing layer in accord with the helical disposition of the differing size ridges therein.

2. A bundle arrangement according to claim 1 wherein said sheathing layer is composed of a multiplicity of adjacently disposed wires of progressively varying diameters.

3. A bundle arrangement according to claim 1 wherein said core is a helically laid multistranded core of electrically conductive wires.

4. A bundle arrangement according to claim 3 wherein said multistranded core of electrically conductive wires includes a center group of wires of high tensile strength.

5. A conductor bundle arrangement comprising at least two adjacently disposed longitudinally extending conducting cable assemblies correspondingly suspended between two longitudinally spaced-apart substantially fixed points and operatively interconnected by spacer means at least at one connecting point longitudinally intermediate said spaced-apart fixed points, each conducting cable assembly including an electrically conductive core having a composite substantially circular cross-sectional configuration and a sheathing layer formed of a multiplicity of adjacently disposed wires of progressively varying diameter helically laid about said core in covering relation therewith, said sheathing layer including at each transverse section thereof at least one first wire of predetermined large diameter disposed at a first circumferential point and at least one last wire of predetermined small diameter disposed at a second circumferential point in substantially diametric relation therewith, and a plurality of intermediately disposed wires of progressively smaller diameters than that of said first wire but larger than that of said last wire adjacently disposed in said sheathing layer on each side of said at least one first wire and occupying the remainder of the circumference thereof between said first and second points in corresponding substantially uniformly decreasing order of diameters in accord with progressive peripheral remoteness thereof from said at least one first wire and terminating in adjacent relation on each side of said at least one last wire, said sheathing layer having a composite cross-sectional configuration corresponding to that of an eccentric annulus and providing an exposed surface characterized by a longitudinally repetitive variation in surface roughness around the circumference thereof in accord with the helical lay of the differing diameter wires therein.

6. A bundle arrangement according to claim 5 wherein said sheathing layer is composed of a multiplicity of round wires in side-by-side single layer disposition, having one common last wire of said predetermined small diameter disposed in diametric relation with one common first wire of said predetermined large diameter and having said intermediately disposed wires graded in diameter to provide a corresponding gradual transition in sheathing layer thickness between said first and last wires on the opposed halves of said sheathing layer surrounding corresponding opposed peripheral portions of said core.

7. A bundle arrangement according to claim 5 wherein said sheathing layer is composed of a multiplicity of round wires and the diameters of said wires are selected to provide said sheathing layer with a composite cross-sectional configuration corresponding to that of an eccentric annulus having a constant radius inner eccentric circle and a constant radius outer eccentric circle, said wires along the extent of the annulus being substantially tangent to both the inner and outer circles thereof.

8. A bundle arrangement according to claim 5 wherein said core is a helically laid multistranded core of electrically conductive wires.

9. A bundle arrangement according to claim 8 wherein said multistranded core of electrically conductive wires includes a center group of wires of high tensile strength.

10. A bundle arrangement according to claim 5 wherein three said adjacently disposed longitudinally extending conducting cable assemblies are provided which are correspondingly suspended in substantially parallel disposition between two longitudinally spaced-apart substantially fixed points and operatively transversely interconnected by said spacer means at least at one connecting point longitudinally intermediate said spaced-apart fixed points.

* * * * *

UNITED STATES PATENT OFFICE
CERTIFICATE OF CORRECTION

Patent No. 3,624,276                Dated November 30, 1971

Inventor(s) Charles B. Rawlins and Fred R. Collins

It is certified that error appears in the above-identified patent and that said Letters Patent are hereby corrected as shown below:

<u>In The Specification</u>

Column 1, line 39, change "One" to --On--;
Column 5, line 34, change "One" to --On--;
Column 13, line  3, after "G.S." insert --=--;
Column 13, line  3, after "Alum" insert --=--;
Column 13, Table 1, No. of Strands Column, insert "2" for Strand Diameter (inches) of 0.128;
Column 13, Table 2, cancel and substitute therefore

|  |  | Strand Diam. (inches) |
|---|---|---|
| Larger diameter strand |  | 0.199 |
|  | ) | 0.190 |
|  | ) | 0.182 |
|  | ) | 0.174 |
|  | ) | 0.167 |
|  | ) | 0.160 |
|  | ) | 0.153 |
| Intermediate strands | ) | 0.146 |
| in first half arc | ) | 0.140 |
|  | ) | 0.134 |
|  | ) | 0.128 |
|  | ) | 0.122 |
|  | ) | 0.117 |

UNITED STATES PATENT OFFICE
CERTIFICATE OF CORRECTION

Patent No. 3,624,276          Dated November 30, 1971

Inventor(s) Charles B. Rawlins and Fred R. Collins

It is certified that error appears in the above-identified patent and that said Letters Patent are hereby corrected as shown below:

```
                              )          0.112
                              )          0.107
Small diameter strand         )          0.102

)          0.107
                              )          0.112
                              )          0.117
                              )          0.122
                              )          0.128
                              )          0.134
Intermediate strands          )          0.140
in second half arc            )          0.146
                              )          0.153
                              )          0.160
                              )          0.167
                              )          0.174
                              )          0.182
                              )          0.190
```

Column 14, line 18, change "or" (second occurance) to --of--

In The Claims

Claim 1, line 9, after "adjacently" insert -- disposed outwardly convex longitudinally extending--

-2-

Signed and sealed this 23rd day of May 1972.

(SEAL)
Attest:

EDWARD M. FLETCHER, JR.         ROBERT GOTTSCHALK
Attesting Officer              Commissioner of Patents